United States Patent
Yoshie

(10) Patent No.: US 6,423,389 B1
(45) Date of Patent: Jul. 23, 2002

(54) METAL TUBE ARMORED LINEAR BODY, METAL TUBE ARMORING LINEAR BODY, METHOD AND APPARATUS FOR MANUFACTURING METAL TUBE ARMORED LINEAR BODY

(75) Inventor: Yasunori Yoshie, Kanagawa (JP)

(73) Assignee: OCC Corporation, Tokyo (JP)

(*) Notice: Subject to any disclaimer, the term of this patent is extended or adjusted under 35 U.S.C. 154(b) by 0 days.

(21) Appl. No.: 09/445,809

(22) PCT Filed: Apr. 14, 1998

(86) PCT No.: PCT/JP98/01697

§ 371 (c)(1),
(2), (4) Date: Feb. 29, 2000

(87) PCT Pub. No.: WO99/53123

PCT Pub. Date: Oct. 21, 1999

(51) Int. Cl.[7] .......................... B32B 1/08; B65G 49/02; F16L 9/14; F16L 9/16; C25D 5/12
(52) U.S. Cl. .................. 428/36.91; 428/36.9; 428/935; 428/939; 204/198; 138/145; 138/146; 205/230; 205/233; 205/237; 205/205; 205/220; 205/181
(58) Field of Search ................................ 205/114, 115, 205/233, 237, 149, 151, 152, 205, 220, 242, 181; 138/145; 204/198; 428/653, 685, 652, 935, 36.9, 36.91

(56) References Cited

U.S. PATENT DOCUMENTS

| | | | | |
|---|---|---|---|---|
| 3,669,851 A | * | 6/1972 | Garvey | 204/25 |
| 4,747,916 A | * | 5/1988 | Kato et al. | 204/58.5 |
| 4,966,659 A | * | 10/1990 | Seto et al. | 204/28 |
| 5,049,206 A | * | 9/1991 | Usui et al. | 148/127 |
| 5,555,338 A | * | 9/1996 | Haag et al. | 385/101 |
| 5,653,898 A | * | 8/1997 | Yoshie et al. | 219/121.63 |
| 5,880,428 A | * | 3/1999 | Marlier et al. | 219/121.63 |

FOREIGN PATENT DOCUMENTS

| | | | |
|---|---|---|---|
| JP | 63230896 | * | 9/1988 |
| JP | 01017889 | * | 1/1989 |
| JP | 01104794 | * | 4/1989 |
| JP | 01136987 | * | 5/1989 |
| JP | 03017292 | * | 1/1991 |
| JP | 06081191 | * | 3/1994 |

* cited by examiner

Primary Examiner—Robert Dawson
Assistant Examiner—Michael J Feely
(74) Attorney, Agent, or Firm—Kanesaka & Takeuchi

(57) ABSTRACT

An object is to provide a metallic-conduit-armored type linear member in which a linear member and the like contained in a metallic conduit do not become damaged and a defect in the metallic conduit can be repaired, a metallic conduit for armoring the linear member, and a method and a system for manufacturing the metallic-conduit-armored type linear member.

The method comprises a basic process (I) in which a metallic tape (1) is formed into a tubular member, a seam of the tubular member is joined to complete a sealed metallic conduit, and a metallic-conduit-armored type linear member (12) is formed by loading a linear member (5) inside the metallic conduit, and a metallic coating process (II) in which a metallic coating layer is formed on an outer surface of the sealed metallic conduit by performing plating by using a room-temperature molten-salt electrolytic bath subsequent to the basic process (I).

26 Claims, 7 Drawing Sheets

METAL TUBE ARMORED LINEAR BODY, METAL TUBE ARMORING LINEAR BODY, METHOD AND APPARATUS FOR MANUFACTURING METAL TUBE ARMORED LINEAR BODY

TECHNICAL FIELD

The present invention relates to a metallic-conduit-armored type linear member wherein a linear member such as an optical fiber or an electrical wire, and in some cases a filler material such as a water sealing compound in addition to the linear member, are accommodated in a metallic conduit, a metallic conduit for armoring the linear member, and a method and a system for manufacturing the metallic-conduit-armored type linear member. More particularly, the present invention concerns a metallic-conduit-armored type linear member in which an outer surface of a metallic conduit is coated with metal, a metallic conduit for armoring the linear member, and a method and a system for manufacturing the metallic-conduit-armored type linear member.

BACKGROUND ART

A linear member armored by a metallic conduit is well known as a cable which can be used even in a hostile environment since the metallic conduit is capable of ensuring mechanical strength and environmental resistance. In the case of the metallic-conduit-armored type linear member disclosed in Japanese Patent Examined Publication No. 10805/1988, an optical fiber 51, which is the linear member, is accommodated in a metallic conduit 52 as a metallic-conduit-armored type linear member 50 shown in the appended FIG. 4. Such a metallic-conduit-armored type linear member shown in FIG. 4 is used singly or as an element of a composite cable, such as the one shown in FIG. 5, in which other cables or tension members 54 are disposed around it. As one method of manufacturing such a metallic-conduit-armored type linear member, a technique is known in which the extra length of the linear member with respect to the length of the metallic conduit is arbitrarily adjusted to positive, zero, or negative in accordance with the working environment (e.g., Japanese Patent No. 2,505,336). Here, the extra length refers to the difference in the length of the linear member with respect to the metallic conduit, and if the linear member is longer, the extra length is called positive extra length, whereas if the metallic conduit is longer, it is called negative extra length. It should be noted that the ratio of the extra length to the length of the metallic conduit is sometimes referred to as the extra length ratio.

A typical example of secondary processing for imparting an additional function to the metallic-conduit-armored type linear member is the formation of a metallic coating layer on the surface of the armoring metallic conduit (see a metallic coating layer 53 in FIG. 4, for example). This metallic coating layer further improves the mechanical strength and environmental resistance which are the functions of the metallic conduit itself. Particularly with respect to the latter, by adopting an appropriate coating metal in the case shown in FIG. 5, for example, it becomes possible to prevent electric corrosion due to the difference in the ionization tendency with respect to the metal constituting the cables or tension members 54 surrounding the metallic-conduit-armored type linear member 50. For example, Japanese Patent Unexamined Publication No. 69,716/1996 discloses a twisted assembly including tension members in which corrosion resistance is enhanced by forming a 5 to 70 μm-thick aluminum coating layer on the surface of an armoring metallic conduit.

As a typical example of the technique for forming such a metallic coating layer on the outer surface of a metallic conduit, the aforementioned Japanese Patent Examined Publication No. 10,805/1988 can be cited. In this example, as shown in FIG. 6, a metallic tape 55A fed out from a tape supply 55 is formed into a tubular shape in a pipe forming step 57, in which step an optical fiber 56A is also concurrently supplied from a fiber supply 56, thereby forming an optical-fiber-accommodating metallic pipe 58. Subsequently, after the seam of this pipe 58 is welded in a welding step 59, the metallic coating layer 53 formed of, for example, aluminum is provided on the outer surface of the metallic pipe 58 by means of vacuum plating such as vacuum deposition, sputtering, ion plating, or the like in a plating step 60. The vacuum plating is performed continuously with respect to the metallic pipe for which welding has been completed, and the plated metallic pipe is taken off by a takeoff 61 and is taken up by a takeup 62.

In addition, in Japanese Patent Unexamined Publication No. 2,909/1985, a metallic tape is formed into a tubular shape, and an optical fiber is concurrently supplied to form an optical-fiber-accommodated metallic pipe, and this pipe is immersed in a molten metal bath so as to weld the seam of the metallic pipe and provide a metallic coating layer on the outer surface of the metallic pipe. Further, in the aforementioned Japanese Patent Unexamined Publication No. 69,716/1996, a metallic layer is provided on the outer surface of an armoring metallic pipe in a sintering process or by a chemical or electrochemical method.

However, the following problems are encountered with the conventional techniques. The first problem is that of the thermal effect. As also pointed out in Japanese Patent Unexamined Publication No. 2,909/1985, in a case where the metallic coating layer is formed on the outer surface of the metallic conduit, the fact that the linear member in the metallic conduit receives a thermally adverse effect presents a large problem, and it does not follow that such a thermally adverse effect can be allowed in light of quality assurance just because the coating layer of the optical fiber is apparently not subjected to thermal damage. Particularly in the case where the linear member is a thermally sensitive substance typified by the optical fiber and in the case where a space filler such as a water sealing compound other than the linear member is filled in the metallic conduit, it can hardly be denied that the provision of vacuum plating without adopting some heating preventing means is very dangerous processing which directly leads to the degradation of the quality of the metallic-conduit-armored type linear member. Particularly in a case where it is necessary to form a thick metallic coating layer with a thickness of not several microns or thereabouts but as much as 10 microns or more, surface treatment must be generally effected for a relatively long time, and the possibility of the thermally adverse effect on the substances which are present in the metallic conduit becomes substantially high.

In addition, the thermally adverse effect during the formation of the coating on the metallic conduit surface is also exerted on the metallic conduit itself. Namely, there is a possibility that defective welds which originally existed are further expanded by the thermal expansion of the metallic conduit itself and the thermal shock acting on the metallic conduit, giving rise to new defective joined portions. In the case where a space filler material such as a water sealing compound is contained in the sealed metallic conduit, there increases the possibility that the thermally expanded space filler material jets out from such defective joined portions. Furthermore, even in a case where such a space filler is not present or in a case where a thermally sensitive substance such as the optical fiber is inserted in the armoring metallic conduit after the formation of the metallic coating, the presence or generation, per se, of the defective welds in the metallic conduit constitutes a major problem in terms of the product quality of the metallic-conduit-armored type linear member. In addition, if the plating bath infiltrates into the interior through the defective welds and then solidifies, there is a possibility of causing trouble to the subsequent loading of the linear member and the space filler material. The foregoing problems become no longer negligible in a case where a thick metallic coating layer with a thickness of as much as 10 microns or more is formed on the metallic conduit or in a case where the metallic-conduit-armored type linear member is exposed under a thermal effect for a longer period of time. To solve these problems, a perfect welding technique is required. However, a perfect welding technique as such does not exist.

If the conventional techniques are considered from such a perspective, in the aforementioned Japanese Patent Examined Publication No. 10,805/1988 there is a teaching that the metallic pipe does not assume a high temperature if the metallic coating layer is formed by vacuum plating, and the coating layer of the optical fiber is therefore not subjected to thermal damage; however, there are cases where the assertion that the plated material does not assume a high temperature by vacuum plating is contrary to the fact. In the case of the aforementioned Japanese Patent Unexamined Publication No. 69,716/1996 only an enumeration is given of known film forming techniques including sintering or chemical or electrochemical means, and there are no teachings concerning how the thermal effect, i.e., the realistic problem of product quality, is solved.

In the final analysis, the surface treatment techniques concerning the metallic conduit for armoring the linear member must have a small thermal effect. However, that alone is insufficient in practice. It is necessary to select an optimum surface treatment technique concerned after taking into consideration the features of the metallic-conduit-armored type linear member and its manufacture.

Secondly, in the plating apparatus in Japanese Patent Unexamined Publication No. 81,191/1994, in the same way as ordinary plating apparatuses for linear members (refer to, for example, Japanese Patent Unexamined Publication Nos. 132,797/1993 and 39,594/1993, Japanese Utility Model Unexamined Publication No. 37,366/1984, Japanese Patent Unexamined Publication No. 117,243/1977, and Japanese Patent Examined Publication No. 23,756/1982), the traveling direction of the member subject to treatment is changed greatly a plurality of times in the process of plating treatment, so that the metallic conduit containing the optical fiber is subjected to virtual mechanical processing. Such mechanical processing also occurs when the member to be treated which is wound around an accommodating device such as a bobbin is unwound for plating treatment or when the member is wound again around the accommodating device after completion of plating. If such mechanical processing is applied to the metallic-conduit-armored type linear member, the metallic conduit shrinks in its longitudinal direction (refer to, for example, Japanese Patent Unexamined Publication Nos. 55,804/1992 and 19,153/1993), and the extra length (positive extra length) increases more than an initial target value. Accordingly, when the surface of the armoring metallic conduit is provided with a metallic coating, special consideration which takes into account such variations in the extra length is required in product quality control.

Thirdly, if mechanical processing is repeatedly provided for the metallic conduit in the plating process, there is a possibility that defective welds at sealed portions are expanded or new defective welds are produced. A similar result is also produced by the thermally adverse effect during the formation of a coating on the metallic conduit, as described above. If defective welds in the metallic conduit remain, the technique of continuously providing a metallic coating on the metallic conduit by the vacuum plating process disclosed in the aforementioned Japanese Patent Examined Publication No. 10,805/1988 is incapable of pressure reduction, and therefore becomes unrealizable. Also, defective welding becomes an issue in a case where the metallic conduit containing the linear member and the space filler is electrochemically formed in an electrolyte atmosphere. Namely, the plating solution enters the interior of the metallic conduit through defective welds, and the reaction with the plating solution takes place inside the metallic conduit as well, causing a decline in the quality of the metallic-conduit-armored type linear member. For this reason, even in cases where the metallic conduit surface is electrochemically treated, special consideration is required with respect to the defective welding of the metallic conduit.

The present invention has been devised in view of the above-described aspects, and its object is to provide a metallic-conduit-armored type linear member in which an outer surface of a metallic conduit is provided with a metallic coating, a metallic conduit for armoring the linear member, and a method and a system for manufacturing the metallic-conduit-armored type linear member.

DISCLOSURE OF THE INVENTION

The above object is attained by a first aspect of the invention concerning a linear member which is armored by a metallic conduit having a metallic coating layer formed thereon by plating treatment which is effected by using a room-temperature molten-salt electrolytic bath, and by a second aspect of the invention concerning a metallic conduit for a metallic-conduit-armored type linear member having a metallic coating layer formed thereon by plating treatment which is effected by using a room-temperature molten-salt electrolytic bath.

In addition, the above object is also attained by a third aspect of the invention concerning a method of manufacturing a metallic-conduit-armored type linear member having a metallic conduit on an outer surface of which a metallic coating layer is formed by plating treatment which is effected by using a room-temperature molten-salt electrolytic bath. In this third aspect of the invention, the metallic conduit may be formed of copper, a copper alloy, or stainless steel, and the metallic coating layer may be formed of aluminum. In addition, the room-temperature molten-salt electrolytic bath may be an electrolytic bath using an $AlCl_3$-1-butyl pyridinium chloride-based or $AlCl_3$-ethylmethylimidazolium chloride-based room-temperature molten salt. At that juncture, the electrolytic bath is preferably 80 to 150° C., more preferably 80 to 100° C.

The above object is also attained by a fourth aspect of the invention concerning a manufacturing method comprising: a basic step of forming a sealed metallic conduit into an interior of which a linear member can be loaded, by forming a metallic tape into a tubular member and by joining a seam of the tubular member; and a metallic coating step of forming a metallic coating layer on an outer surface of the sealed metallic conduit by performing plating by using a room-temperature molten-salt electrolytic bath subsequent to the basic step. In this fourth aspect of the invention, an inspecting step may be further provided between the basic step and the metallic coating step for performing quality inspection of the metallic-conduit-armored type linear member. Further, an extra-length adjusting step may be provided for adjusting the extra length of the linear member with respect to the sealed metallic conduit. This extra-length adjusting step need not be provided in the basic step. The extra-length adjusting step may be provided in the basic step, or the extra length may be adjusted in a line separate from the line for continuously manufacturing the metallic-conduit-armored type linear member.

In addition, the above object is also attained by a fifth aspect of the invention concerning a manufacturing method comprising: a basic step of forming a sealed metallic conduit into an interior of which a linear member can be loaded, by forming a metallic tape into a tubular member and by joining a seam of the tubular member; a metallic coating step of forming a metallic coating layer on an outer surface of the sealed metallic conduit subsequent to the basic step; and an inspecting step provided between the basic step and the metallic coating step for performing quality inspection of the metallic-conduit-armored type linear member. The metallic coating forming technique applicable in this fifth aspect of the invention is not limited to the plating technique using the room-temperature molten-salt electrolytic bath in the third aspect of the invention, and vacuum plating and other known film forming techniques suffice. The basic step, the inspecting step, and the extra-length adjusting step are similar to the case of the fourth aspect of the invention.

Furthermore, the above object is also attained by a sixth aspect of the invention concerning a manufacturing system comprising: a basic processing apparatus for forming a sealed metallic conduit into an interior of which a linear member can be loaded, by forming a metallic tape into a tubular member and by joining a seam of the tubular member; and a metallic coating apparatus for forming a metallic coating layer on an outer surface of the sealed metallic conduit by performing plating by using a room-temperature molten-salt electrolytic bath. In this sixth aspect of the invention, the manufacturing system may further comprise: an inspecting apparatus for performing quality inspection of the metallic-conduit-armored type linear member fabricated by the basic processing apparatus, a repairing apparatus for performing necessary repair with respect to the metallic-conduit-armored type linear member on the basis of the result of inspection, or an extra-length adjusting apparatus for subsequently adjusting the extra length of the linear member with respect to the sealed metallic conduit.

As described above, in accordance with the present invention, since a metallic coating is provided on the outer surface of the armoring metallic conduit by using the room-temperature molten-salt electrolytic bath, it is possible to provide an armoring metallic conduit provided with a metallic coating or a linear member contained in such an armoring metallic conduit, which is not subjected to adverse effects due to heat, moisture, and an organic solvent, and whose yield and quality as a product are high. In addition, in accordance with the manufacturing method and the manufacturing system in accordance with the present invention, by virtue of the metallic coating on the surface of the armoring metallic conduit using the room-temperature molten-salt electrolytic bath, it is possible to overcome various problems which can occur in the subsequent metallic coating treatment owing to the presence of defective welds and/or other causes. Furthermore, since extra-length control is provided by estimating variations in the extra length which occur in the process from the fabrication of the armoring metallic conduit until completion of the metallic coating on the surface of the armoring metallic conduit, it is possible to manufacture a high-quality metallic-conduit-armored type linear member whose extra length is adjusted to a target value.

BEST MODE FOR CARRYING OUT THE INVENTION

Figure 1:
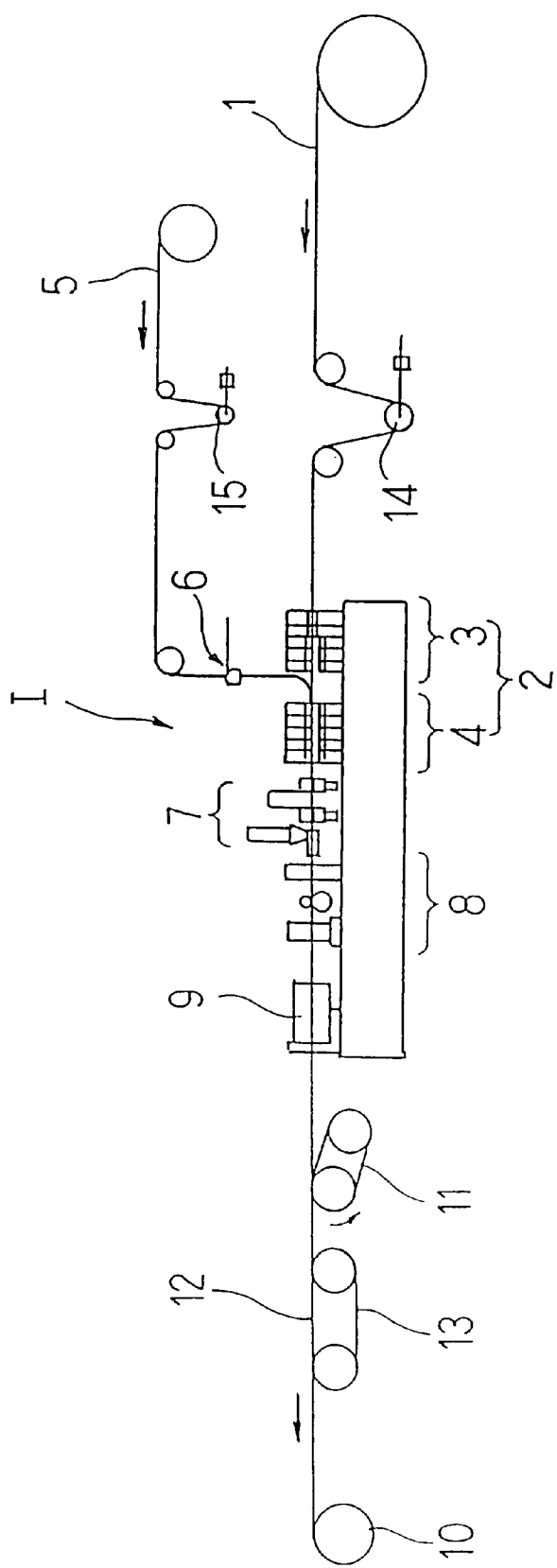
FIG. 1 is a schematic diagram illustrating a basic processing apparatus of the present invention.

It is essential that the technique for providing a metallic coating on the surface of a metallic conduit for armoring a linear member has a small thermal effect, but must be a technique which is capable of forming a metallic coating in a nonaqueous environment. If moisture remains in the metallic conduit for armoring the linear member, the metallic conduit corrodes, and the deterioration of the linear member results. It is known that if the linear member is an optical fiber, in particular, the presence of the moisture leads to appreciable deterioration of optical transmission characteristics.

However, just the requirements of the thermal effect being small and the nonaqueous system being used are still insufficient, and the aforementioned metallic coating technique must not be a technique using a large quantity of organic solvent bath (e.g., Japanese Patent Unexamined Publication Nos. 129,989/1989 and 129,995/1989). This is because the large quantity of organic solvent adversely affects the surface of the linear member and the space filler material. For example, if the surface of the linear member is resin-coated as in the case of the optical fiber, or is protected by a resin material as in the case of the electric cable, such a resin coating or resin material is dissolved by the organic solvent. Such a phenomenon particularly constitutes a problem if holes penetrating to both inner and outer sides remain in a weld of the metallic conduit, and it also constitutes a problem if a gasified organic solvent infiltrates the interior of the metallic conduit under some circumstances. There is another problem in that the space filler material also becomes dissolved in the organic solvent and becomes denatured. In addition, the maintenance and management of the large quantity of organic solvent constitute a problem in terms of safety as well. Note, however, that the subject of the present invention is not limited to a linear member which is protected by a resin coating or a resin material.

In contrast, the electroplating technique using a room-temperature or low-temperature molten-salt electrolytic bath (e.g., Japanese Patent No. 2,540,110 and Japanese Patent Unexamined Publication No. 17,889/1989) produces a small thermal effect, it employs a nonaqueous electrolyte, and the large quantity of organic solvent is not contained in it, so that this electroplating technique is most suitable for the metallic coating of the metallic conduit for armoring the linear member. This time the inventors discovered this fact for the first time. In practice, not to mention an example in which the electroplating technique using the room-temperature or low-temperature molten-salt electrolytic bath is applied to a metallic conduit containing a linear member or other thermally sensitive substances and a space filler material, there has been no former example in which a thick plating layer with a thickness of as much as 10 μm or more is formed on the outer surface of the metallic conduit by using this technique. To be sure, there is a former example (e.g., Japanese Patent Unexamined Publication No. 81,191/1994) in which aluminum plating is provided at a low temperature on the surface of a continuously traveling metal strip by using the room-temperature or low-temperature molten-salt electrolytic bath. However, this example was devised by taking note of the fact that plating can be effected in a low-temperature environment and the fact that the maintenance and management of the electrolyte are facilitated since no organic solvent bath is used, and this example was not devised for the specific purpose of preventing adverse effects, which are attributable to moisture and a large quantity of organic solvent, on the substances contained in the metallic conduit provided with a metallic coating, and of preventing thermally adverse effects on the armoring metallic conduit.

Thus, in the present invention, a metallic coating is provided on the armoring metallic conduit by using the room-temperature or low-temperature molten-salt electrolytic bath which is nonaqueous and does not contain a large quantity of organic solvent. Even if the thickness of the metallic coating layer exceeds 10 μm, the metallic-conduit-armored type linear member having the metallic coating thus formed or its metallic conduit is not subjected to adverse effects, which are attributable to heat, moisture, and the organic solvent, on the linear member typified by a thermally sensitive optical fiber and an electric cable, a space filler material typified by a water sealing compound, other inclusions, and the armoring metallic conduit itself, and therefore its yield and quality as a product are high.

It should be noted that the present invention does not exclude the case in which a metallic coating is provided on the surface of an armoring metallic conduit of a metallic-conduit-armored type linear member (e.g., Japanese Patent Examined Publication Nos. 22,921/1990 and 16,887/1992 and Japanese Patent Unexamined Publication No. 108,605/1980) which is fabricated by inserting a linear member into the metallic conduit 3 prepared in advance. The reason is that technical concept, per se, in which a metallic coating is provided on the surface of the armoring metallic conduit by using the room-temperature or low-temperature molten-salt electrolytic bath is novel, and the aforementioned problems occurring due to the thermal effect can occur insofar as the armoring metallic conduit is fabricated by the formation of the metal tape and the sealing and welding of butted portions, so that such problems can be overcome by the present invention.

The metallic-conduit-armored type linear member in accordance with the present invention is manufactured by a method comprising: a basic step of forming an armoring metallic conduit into an interior of which a linear member can be loaded, by joining a seam of butted portions of a metal tape formed into a tubular shape; and a metallic coating step of providing a metallic coating on the surface of the armoring metallic conduit. In this case, if the line for performing the basic step and the line for performing the metallic coating step are made discontinuous, it becomes possible to effect adjustment for speed synchronization between an upstream step (basic step) and a downstream step (metallic coating step).

As for the armoring metallic conduit formed in the basic step, since the inspecting step is provided between the two steps for the thermally sensitive substance such as the optical fiber, the welded state of the seam portion of the armoring metallic conduit can be precisely inspected, and problems which occur in a metallic coating layer on the armoring metallic conduit can be detected prior to the metallic coating. In addition, if the inspecting step is handled in a line separate from the line for manufacturing the metallic-conduit-armored type linear member in which the armoring metallic conduit is provided with a metallic coating, it becomes possible to effect adjustment for speed synchronization between the upstream step (basic step) and the downstream step (metallic coating step) in such a line for manufacturing the metallic-conduit-armored type linear member.

In the present invention, a repairing step is further provided between the inspecting step and the metallic coating step for repairing a defect in the metallic-conduit-armored type linear member detected as a result of the quality inspection. For this reason, quality inspection is performed in the inspecting step before formation of the metallic coating layer on the outer surface of the armoring metallic conduit fabricated in the basic step so as to precisely inspect the welded state at the seam portion of the metallic conduit, thereby making it possible to overcome the problems which occur in the subsequent metallic coating step due to the presence of defective welds.

In the present invention, an extra-length adjusting step is further provided for adjusting the extra length of the linear member with respect to the sealed metallic conduit. The extra-length adjusting step may be provided in the basic step. Alternatively, the extra-length adjusting step may be performed in the same line as the line for continuously manufacturing the metallic-conduit-armored type linear member, or may be performed in a line separate from the same. By virtue of such a step, control can be provided so that the extra length of the linear member with respect to the sealed metallic conduit ultimately reaches a target value by taking into consideration the shrinkage of the sealed metallic conduit attributable to virtual mechanical processing which occurs in the process of the basic step and the metallic coating step and/or between the two steps. For example, in a case where the basic step has the extra-length adjusting step, and a taking-up step for taking up the armoring metallic conduit for which repair has been completed and for storing the armoring metallic conduit on a rotating member and a step of unwinding the armoring metallic conduit taken up in the taking-up step so as to be used in the metallic coating step are further provided between the repairing step and the metallic coating step, there occur the shrinkage of the armoring metallic conduit, which is attributable to virtual mechanical processing to which the armoring metallic conduit is subjected in the taking-up and unwinding steps, and hence a change in the extra length. Therefore, a final extra length value can be set as a target value by controlling the extra length in this extra-length adjusting step by estimating this change or further changes occurring in the subsequent steps.

It should be noted that, in the above-described example, virtual mechanical processing with respect to the armoring metallic conduit occurs due to winding around or engagement with the rotating member relating to the taking-up and unwinding, but also occurs due to deflection in other steps, particularly engagement with rotating members. Such rotating members can be found in a large number in the metallic coating step. The reason for this is that if the deflection of the armoring metallic conduit is repeated, a long metallic coating route can be secured by a small facility and a small building area.

Since the system for manufacturing a metallic-conduit-armored type linear member in accordance with the present invention is comprised of a metallic coating apparatus for subjecting the armoring metallic conduit to plating by using a room-temperature molten-salt electrolytic bath, it is possible to manufacture a metallic-conduit-armored type linear member which is high in product yield and quality by avoiding adverse effects, which are attributable to heat, moisture, and an organic solvent, on the armoring metallic conduit itself or its inclusions. In addition, since an inspecting apparatus is provided for performing quality inspection of the armoring metallic conduit fabricated by the basic processing apparatus, problems which occur in a metallic coating layer on the armoring metallic conduit can be detected prior to the metallic coating. In this case, since a repairing apparatus is further provided, if an abnormality is detected by the inspecting apparatus, necessary repair can be provided to obtain a sound armoring metallic conduit suitable for metallic coating treatment. In addition, since an extra-length adjusting apparatus is further provided, the extra length can be controlled so that the extra length ultimately assumes a target value, by estimating a change in the length of the armoring metallic conduit occurring in the product manufacturing process or in the event that an offset in the extra length is detected by the inspecting apparatus.

Referring now to the appended FIGS. 1 to 3 and FIG. 7, a description will be given of an embodiment of the present invention. The system in this embodiment is comprised of a basic processing apparatus I and a metallic coating apparatus II which are respectively illustrated in the drawings.

FIG. 1 is a schematic diagram of the above-described basic processing apparatus I. As shown in the drawing, the basic processing apparatus I for fabricating the metallic-conduit-armored type linear member is comprised of an assembling stage 2 including a first assembling stage 3 and a second assembling stage 4 for forming a metal strip 1 into a tubular shape by causing its opposite side ends to abut against each other; an optical-fiber introducing means 6 disposed between the first assembling stage 3 and the second assembling stage 4 so as to introduce, for example, an optical fiber cable 5 as the linear member into the formed metallic conduit; and a laser welding means 7 disposed in a stage following the assembling stage 2 so as to weld the butted portions of the metallic conduit.

A measuring section 8 and a drawing means 9 are juxtaposed at positions downstream of the laser welding means 7. A traction means which includes a tension varying means 11 and a tension adjusting means 13 for adjusting the tension of a metallic-conduit-armored optical fiber cable 12 is disposed between this drawing means 9 and a cable takeup 10.

An extra-length controlling means for adjusting the relative length, i.e., extra length, of the optical fiber cable with respect to the metallic conduit is formed by the tension varying means 11, the tension adjusting means 13, a tension adjusting means 14 disposed in a stage preceding the assembling stage 2 so as to adjust the tension of the metal strip 1, and a tension adjusting means 15 for adjusting the tension of the optical fiber cable 5. The extra-length controlling means makes it possible to set the extra length to a positive extra length, a zero extra length, or a negative extra length by adjusting the tension, and its value can be set to a desired value.

The metallic-conduit-armored optical fiber cable 12 is temporarily taken up onto a bobbin by the aforementioned cable takeup 10 at a terminating end of the basic processing apparatus I, and is subsequently supplied to the metallic coating apparatus II, which will be described later, to provide a metallic coating.

As a specific example of the metallic-conduit-armored type linear member, it is possible to cite the following, by way of example.

Size of the metallic conduit: In the case of SUS 304
inside diameter/outside diameter ($\phi$ mm)=1.8/2.2 to 3.2/3.6
wall thickness: 0.2 mm
Optical fiber: 250 $\mu$m, a maximum of 24 fibers can be inserted in the aforementioned metallic conduit
Overall length (km): 5 km or more
Filler material: synthetic oil (heat resistance: 100° C. or less)

In addition, in its modifications, the linear member may be a plurality of optical fibers with tension members disposed therearound, a single or a plurality of optical fibers coated with ultraviolet-curing acrylate resin (heat resistance: 80° C. or thereabouts), an electric cable, or other linear members, while the armoring metallic conduit may be made of metal including copper, a copper alloy, and an iron-based alloy.

The armoring metallic conduit not containing the linear member is fabricated by the basic processing apparatus I shown in FIG. 1. Namely, it suffices if the metal strip 1 is formed by the assembling stage 2 without supplying the linear member 5 and is formed into a tubular shape by causing opposite side ends to abut against each other, butted portions are sealed by the laser welding means 7 which welds them, and the armoring metallic conduit thus formed is taken up onto the bobbin 10 via the drawing means 9. This armoring metallic conduit not containing the linear member is supplied to the metallic coating apparatus II, which will be described later, to provide a metallic coating. Further, the linear member is inserted into its interior by using the technique shown in Japanese Patent Examined Publication No. 22,921/1990 or 16,887/1992, Japanese Patent Unexamined Publication No. 108,605/1980, or the like, contributing to the manufacture of the metallic-conduit-armored type linear member. In this context, that which is fabricated by the basic processing apparatus I will be generally referred to as the "armoring metallic conduit," unless otherwise specified, regardless of whether or not the linear member is loaded in its interior.

Next, referring to FIG. 2, a description will be given of the metallic coating apparatus II in which the armoring metallic conduit (whether or not the linear member or the space filler material are provided in its interior is disregarded; hereinafter the same) fabricated by the above-described basic processing apparatus I is treated.

The metallic coating apparatus II has in the front and in the rear of a bath 21 an opening portion 23 for leading the armoring metallic conduit 12 into it and an opening portion 24 for leading the armoring metallic conduit 12 out of it, respectively, and seal rolls 25 are respectively fitted in these opening portions 23 and 24, the bath 21 being thus sealed in a semihermetic state. A plurality of energizing rolls 28 and a plurality of sink rolls 29 are arranged in an upper portion and on the bottom side inside the bath 21, respectively, the armoring metallic conduit 12 is wound around these rolls alternately, and the armoring metallic conduit 12 introduced from the opening portion 23 repeatedly moves in upward and downward directions and is led to the outside from the opening portion 24.

The supply of the armoring metallic conduit 12 to the metallic coating apparatus II is effected by the feeding of the armoring metallic conduit 12 from a storing bobbin by a feeder 20. After known pretreatment is provided for the armoring metallic conduit 12, the armoring metallic conduit 12 is introduced into the apparatus II. After passing through the apparatus, the armoring metallic conduit 12 is fed to the outside, is subjected to appropriate post-treatment, and is accommodated again by being wound around a bobbin by a takeup 32. The movement of such an armoring metallic conduit 12 is effected by traction by the takeup 32 or by traction by the driving of the respective energizing rolls 28.

In the apparatus II, an inert-gas supplying pipe 26 is provided on an upper surface of the bath 21 to supply an inert gas whose dew point is adjusted to $-10°$ C. or less, so that the internal pressure is maintained at a level higher than the atmospheric pressure by 0.05 mm or more. The inert gas before being supplied is cooled by a cooler 27 disposed midway in the inert-gas supplying pipe 26, and its dew point is adjusted to $-10°$ C. or less.

Then, at portions opposing the armoring metallic conduit 12 which moves vertically between the energizing rolls 28 and the sink rolls 29, anode plates 30 are arranged in parallel on both sides of the armoring metallic conduit 12. Nozzles 31 are each disposed in an upper portion between the anode plate 30 and the armoring metallic conduit 12 to eject a plating electrolyte therebetween.

As this electrolyte, an $AlCl_3$-1-butyl pyridinium chloride-based or $AlCl_3$-ethyl-methylimidazolium chloridebased room-temperature molten salt is ejected from each nozzle 31. The former is composed of 67 mol % $AlCl_3$ and 33 mol % butyl pyridinium chloride as disclosed in, for example, Japanese Patent No. 2,540,110. According to such a non-aqueous electrolyte which does not employ an organic solvent, aluminum electroplating is possible at high speed at $100°$ C. or less, and since electroplating is possible at 80 to $150°$ C. which is sufficiently lower than the conventional process, the plating temperature can be appropriately set within this range in accordance with the properties of the armoring metallic conduit 12 subject to plating, i.e., in accordance with the presence or absence of the linear member, the kind and characteristics of the contained linear member, and the like. For this reason, the thermally adverse effect on the butt-connected portion of the armoring metallic conduit 12 can be avoided, and the surface of the armoring metallic conduit can be coated with metal without adversely affecting the thermally sensitive linear member and space filler material whose degradation in their characteristics and degeneration can be otherwise caused by the organic solvent or moisture which can be present in its interior.

The thickness of the aluminum coating thus formed can be set to 10 $\mu$m or more, e.g., 12 to 18 $\mu$m. In addition, the temperature of the electrolyte, i.e., the plating temperature, can be set in accordance with the heat-resisting temperature of the resin for coating the optical fiber core. The traveling speed of the armoring metallic conduit being plated is set by taking into consideration the viscosity of the electrolyte, its electrical conductivity (current velocity), plating thickness, the denseness of the plating layer, the number of plating baths, and the like, but the traveling speed of the armoring metallic conduit is generally set to 5 m/min or more.

Figure 2:
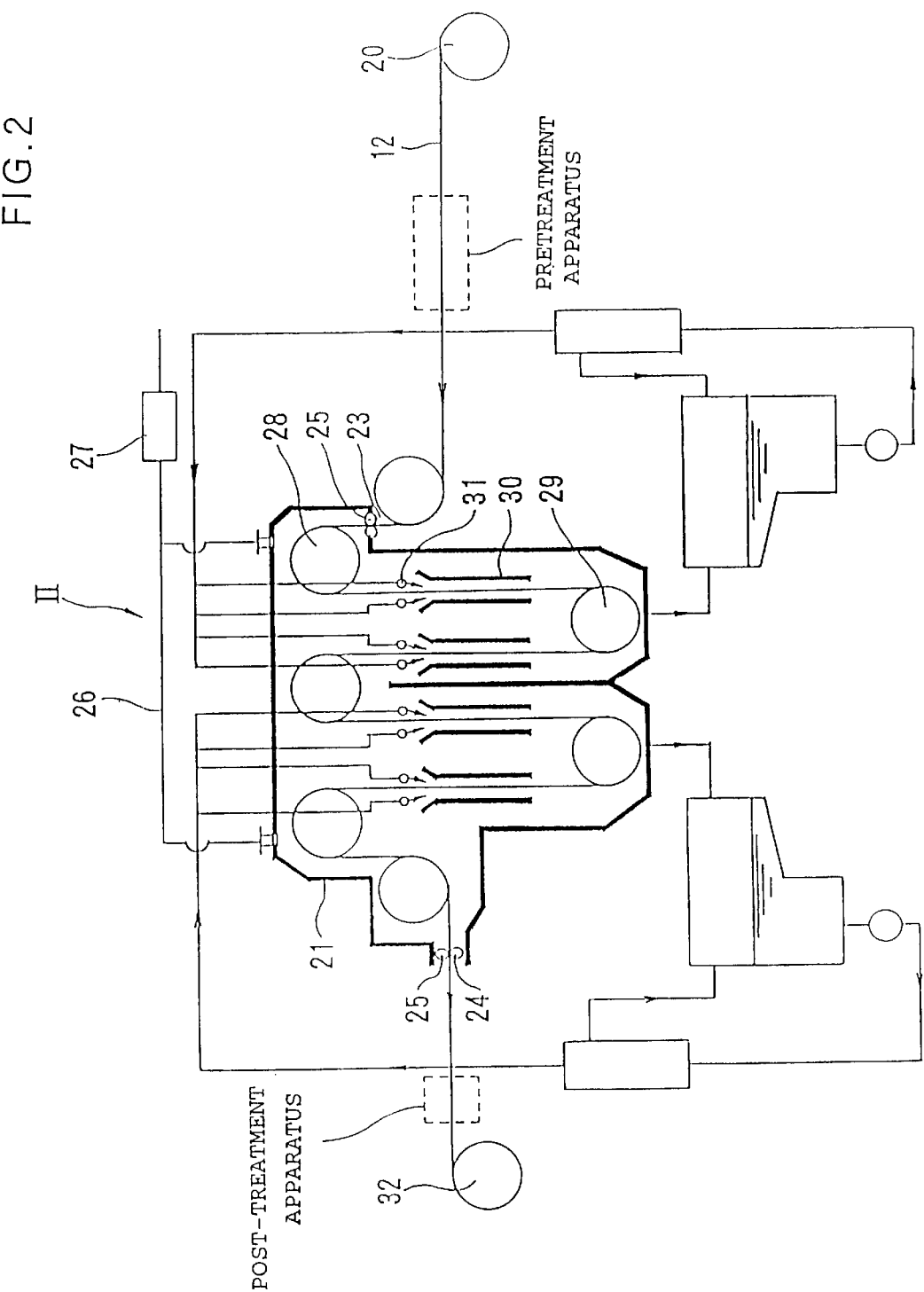
FIG. 2 is a schematic diagram illustrating a metallic coating apparatus of the present invention.
Figure 7:
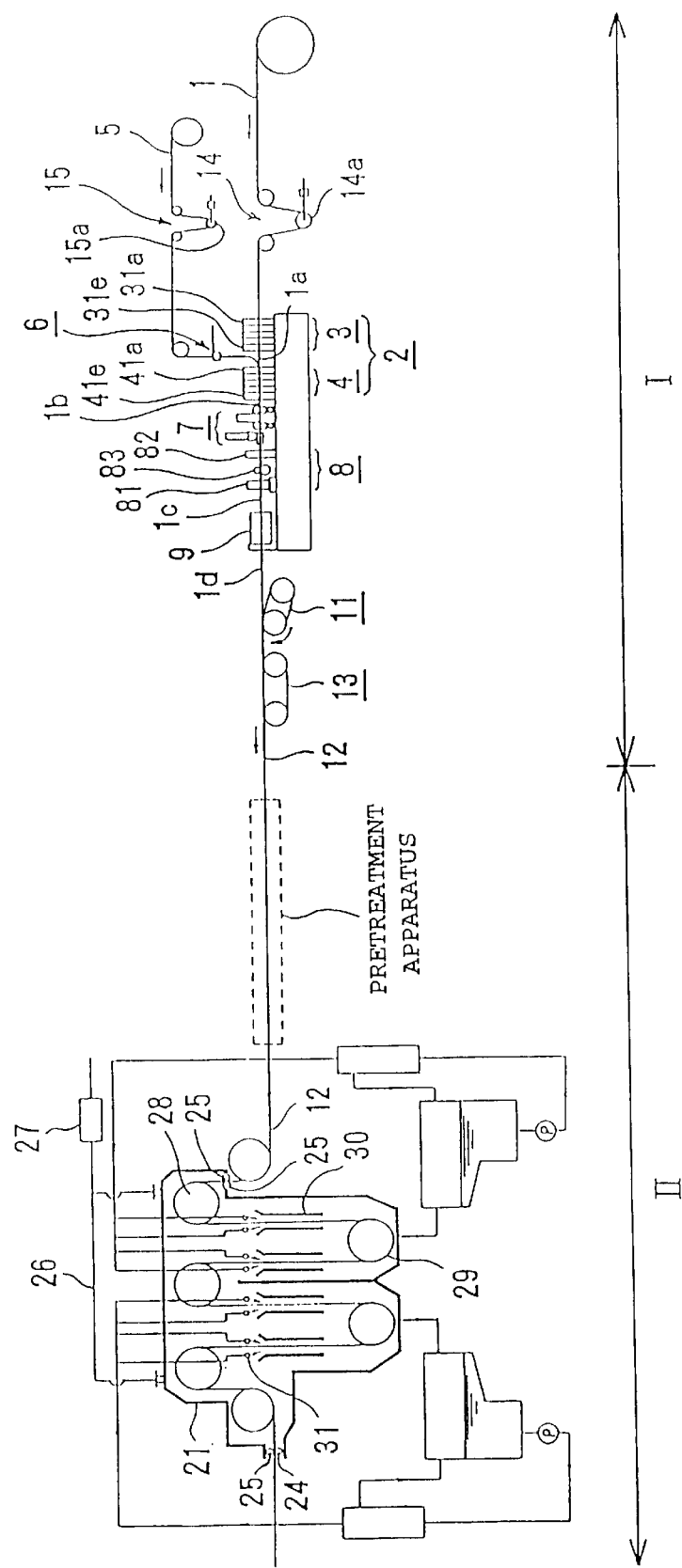
FIG. 7 is a diagram illustrating an example of a system for manufacturing a metallic-conduit-armored type linear member in accordance with the present invention.

In accordance with the embodiment shown in FIGS. 1 and 2, after the metallic-conduit-armored type linear member is temporarily taken up onto the bobbin by the cable takeup 10 at the terminating end of the basic processing apparatus I, the metallic-conduit-armored type linear member is supplied to the metallic coating apparatus II where the outer surface of the armoring metallic conduit is provided with a metallic coating. However, the present invention is not limited to the same, and a metallic coating layer may be continuously formed on the surface of the metallic conduit for the metallic-conduit-armored type optical fiber whose extra length has been controlled, by a series of longitudinal-line processing of the basic process and the metallic coating process based on a series connection of the basic processing apparatus I and the metallic coating apparatus II as shown in FIG. 7. It should be noted that, in either case, washing, pickling, cleaning, drying, surface treatment (e.g., nickel plating treatment) for improving the adhesion of the coating metal on the metallic conduit surface, and other pretreatment are provided in advance for the outer surface of the metallic conduit immediately before being supplied to the metallic coating apparatus II, regardless of whether or not the linear member is already contained in its interior.

The fabrication of the armoring metallic conduit and metallic coating treatment based on the discontinuous arrangement of the basic processing apparatus I and the metallic coating apparatus II shown in FIGS. 1 and 2 on the one hand, and processing based on the continuous arrangement in a single longitudinal line of the basic processing apparatus I and the metallic coating apparatus II shown in FIG. 7, i.e., processing in which the armoring metallic conduit fabricated by the apparatus I is directly fed to the apparatus II, on the other hand, are common in that both are examples of the embodiment in accordance with the present invention. However, the former processing differs from the latter processing in that the armoring metallic conduit can be temporarily stored on the bobbin 10, and the apparatus I and the apparatus II can be cut off from each other. For this reason, in a case where a difference is noted between the traveling speed of the armoring metallic conduit in the apparatus I and that in the apparatus II, the running of one apparatus interferes with the running of the other in the latter processing, and the adjustment of interlocking conditions or speed synchronization between the two apparatuses is relatively difficult, so that special consideration is required. In the former processing, however, since the armoring metallic conduit can be temporarily stored on the bobbin 10, and the apparatus I and the apparatus II can be cut off from each other, the adjustment of speed synchronization between the two apparatuses is facilitated, so that this arrangement is more preferable.

Next, a description will be given of another embodiment of the present invention. In the foregoing embodiment, the armoring metallic conduit formed by the basic processing apparatus I is brought to the metallic coating apparatus II to form a metallic coating on its outer surface. This embodiment, however, is characterized in that an inspecting apparatus, or a repairing apparatus together with the same, is disposed as an intermediate apparatus or apparatuses. Although the inspecting apparatus is also present in the measuring section 8 of the apparatus I, it is preferred that the inspecting apparatus used in the inspecting process effected between the basic processing process and the metallic coating process be of higher accuracy than the measuring section 8, or a different kind of a measuring technique be applied. If the apparatus I does not have the measuring section 8, this inspecting process may replace the same.

The intermediate apparatus III in this embodiment may be formed as part of the continuous line in which the armoring metallic conduit 12 is continuously made to travel between the basic processing apparatus I and the metallic coating apparatus II, or may be formed as a separate line by removing from the line the armoring metallic conduit 12 wound around the bobbin. However, in view of the fact that the apparatus I and the apparatus II are discontinuous, the latter arrangement is preferable since the adjustment of speed synchronization between the two apparatuses is facilitated.

In a preferred form of the present invention, the intermediate apparatus III has together with an inspecting apparatus 41 a repairing apparatus 42 as well, but only the former may be provided, or an inspecting apparatus having a repairing function (e.g., refer to Japanese Utility Model Unexamined Publication No. 92,485/1986) may be used. The inspecting apparatus 41 detects flaws in the metallic conduit by means of, for instance, a magnetic or optical means, and the repairing means 42 repairs the metallic conduit by rewelding defective portions by, for instance, laser irradiation.

Figure 3:
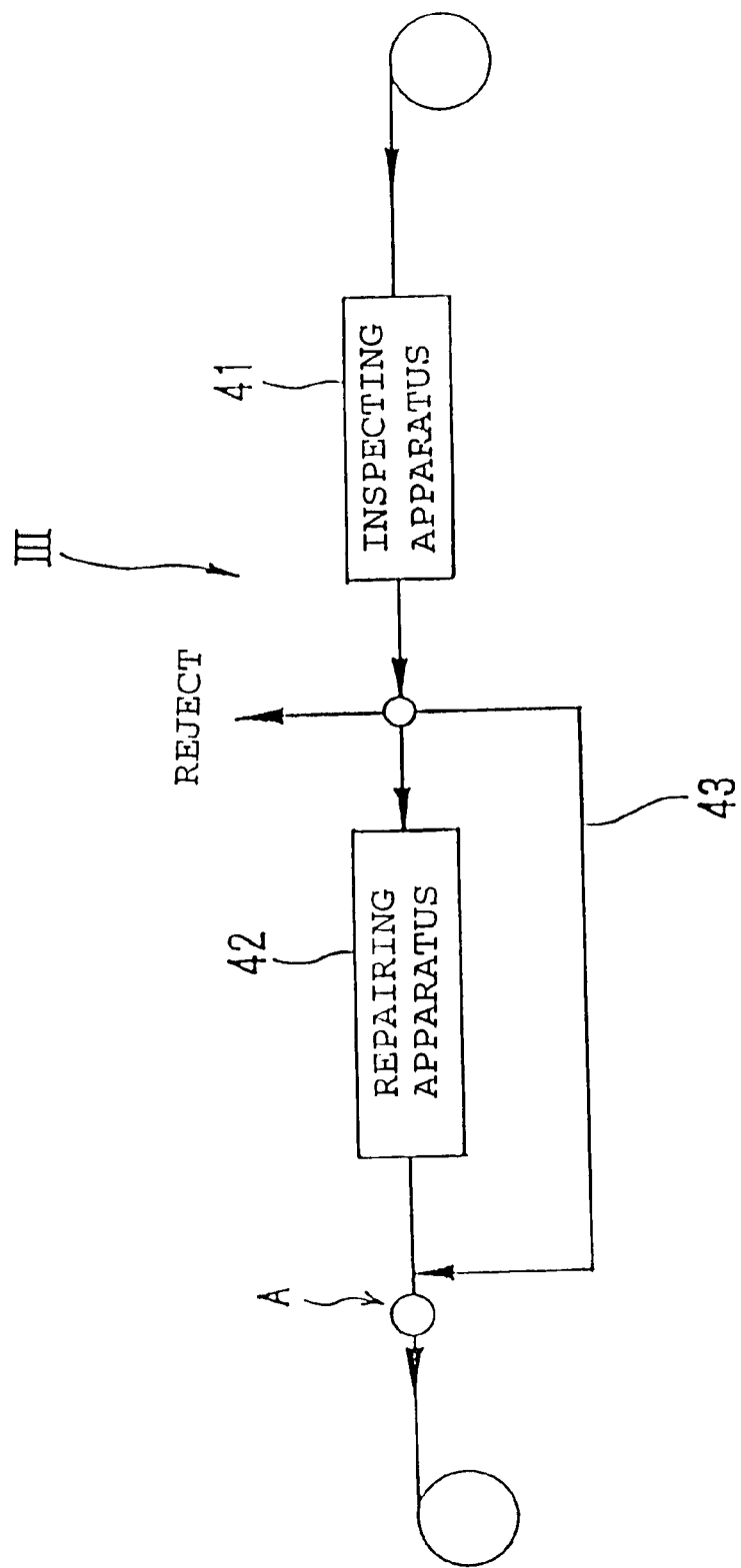
FIG. 3 is a schematic diagram illustrating intermediate apparatuses of the present invention.
Figure 4:
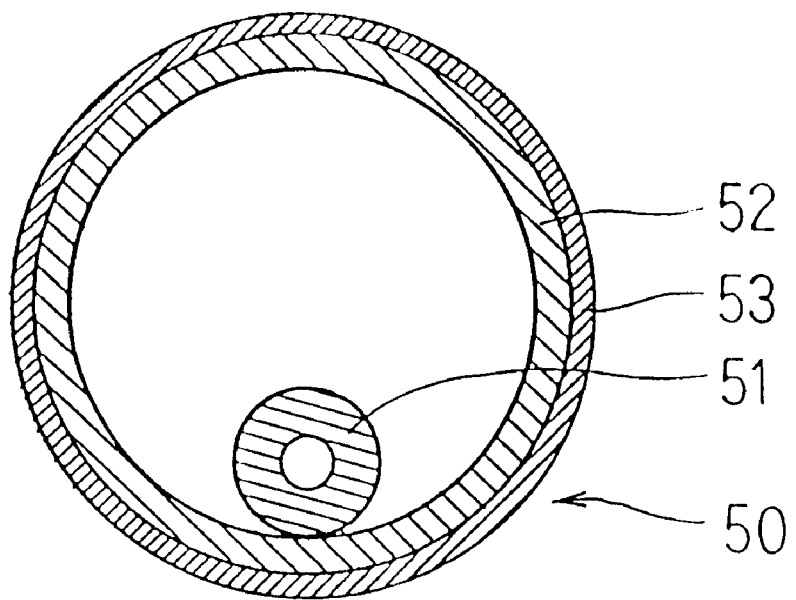
FIG. 4 is a cross-sectional view of a metallic-conduit-armored optical fiber cable.
Figure 5:
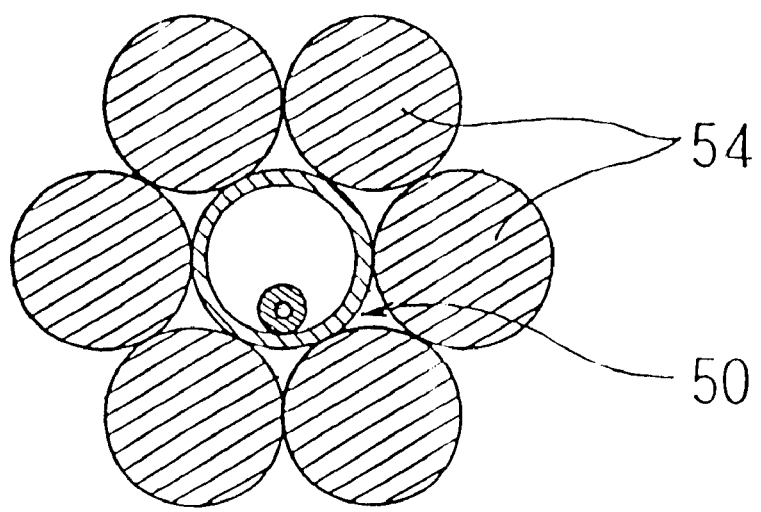
FIG. 5 is a cross-sectional view of a composite cable using the metallic-conduit-armored optical fiber cable shown in FIG. 4.
Figure 6:
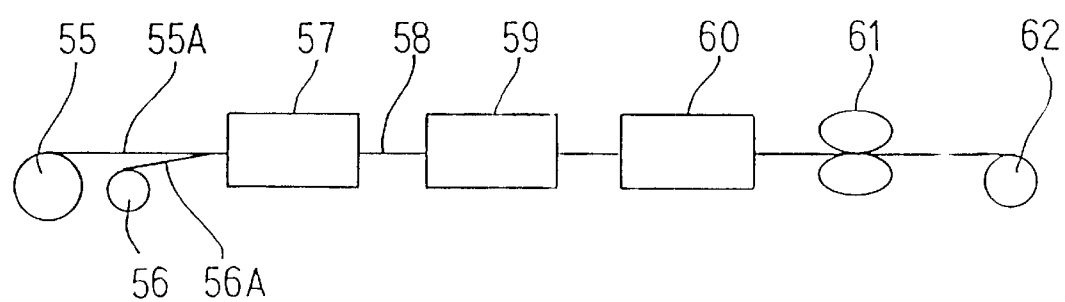
FIG. 6 is a diagram of a conventional process for manufacturing a metallic-conduit-armored optical fiber cable.

The intermediate apparatus III shown in FIG. 3 also has the repairing apparatus 42 together with the inspecting apparatus 41 as a preferred form of the present invention. According to this embodiment, before a metallic coating layer is formed on the outer surface of the metallic-conduit-armored type linear member, fabricated by the basic processing apparatus I, by the metallic coating apparatus II, the metallic-conduit-armored type linear member is taken up onto the bobbin and is temporarily removed from the manufacturing line, and processing in a separate line is provided. Namely, quality inspection is first performed by the inspecting apparatus 41. As a result, the welded state of the seam of the armoring metallic conduit is precisely inspected, and if the result is satisfactory, the armoring metallic conduit is wound around the storing bobbin in accordance with a loop 43, and is subsequently subjected to metallic coating treatment in the original manufacturing line. If the result of inspection is unsatisfactory and the armoring metallic conduit cannot be repaired, the armoring metallic conduit is rejected from the loop 43, i.e., discarded or used for a different application, and is not subjected to the subsequent metallic coating treatment in the original manufacturing line. However, if the armoring metallic conduit is repairable, the armoring metallic conduit is sent to the repairing apparatus 42 in the loop 43, and after it is repaired, the armoring metallic conduit is subjected to metallic coating treatment in the original manufacturing line.

If the armoring metallic conduit is repaired in the above-described manner, the metallic-conduit-armored type linear member which can withstand the subsequent metallic coating process can be regenerated, and the virtual product yield can be improved. Such a regeneration measure is important particularly in the case of long products.

Specifically, in the process of immersing the armoring metallic conduit in the plating bath as in the present invention, the following problems, among others, constitute intrinsic problems: the problem that the inner wall of the metallic conduit becomes plated and the filler material jets out from defective welds to the outside due to heat; the problem that welding defects become enlarged due to deformation accompanying a change in the traveling direction in the plating process, making it impossible to effect processing in that process or its subsequent processes; and the problem that particularly in the case where the linear member is afterwards inserted into the armoring metallic conduit, if the electrolyte infiltrates into the interior from the defective welds and solidifies, trouble is caused to the insertion itself. In accordance with this embodiment, however, since inspection and repair are performed with respect to the armoring metallic conduit before being subjected to metallic coating treatment, the number of defective welds present prior to metallic coating treatment and the probability of occurrence of defective welding during the relevant treatment can be minimized, so that the aforementioned intrinsic problems can be overcome.

Further, in a case where a plurality of taking-up processes and unwinding processes are provided between the basic process and the metallic coating process, since the extra-length adjusting process is provided in the basic process, a final extra length value can be set as a target value by controlling the extra length in the upstream process by estimating the shrinkage of the metallic conduit, which is attributable to mechanical processing to which the metallic conduit is subjected in the taking-up and unwinding processes, and hence a change in the extra length.

It is not necessary for the extra-length adjusting process to be positioned in the basic process. Although the extra-length adjusting process may be provided in the basic process, the adjustment of extra length may be made in a process separate from the basic process and the metallic coating process or by an apparatus separate from the basic processing apparatus I and the metallic coating apparatus II. In particular, the latter case in which the adjustment is made in a separate process or by a separate apparatus is effective in a case where excessive negative extra length resulted in the extra-length adjustment in the former case. As examples of the former case, it is possible to cite an extra-length adjusting means provided in the apparatus I itself and a specially added in-line extra-length adjusting means (Japanese Patent Unexamined Publication No. 19,153/1993). This is suitable for a manufacturing line in which the apparatuses I and II are arranged in a series as shown in FIG. 7 to continuously manufacture and process the armoring metallic conduit, as well as for its manufacturing process. As an example of the latter case, it is possible to cite Japanese Patent Unexamined Publication No. 55,804/1992. If extra-length adjustment is to be made in the intermediate apparatus III shown in FIG. 3, it is preferable to install the extra-length adjusting means at position A. The reason is that it suffices if the extra-length adjustment is provided only with respect to nondefective products which passed the inspecting process and the repair process.

By virtue of such an extra-length adjustment process, control can be provided so that the extra length of the linear member with respect to the metallic conduit ultimately reaches a target value by taking into consideration the shrinkage of the metallic conduit due to virtual mechanical processing (repetition of 180° change in the traveling direction by the rolls in the metallic coating apparatus in FIG. 2, for instance) which occurs between the basic process and the metallic coating process and/or in the metallic coating process.

The above description is given as a mere enumeration of embodiments for specifically realizing the present invention, and the present invention is therefore not limited to the foregoing embodiments.

Claims:

1. A method of manufacturing a metallic-conduit-armored type linear member which is armored by a metallic conduit, comprising the steps of forming a plating layer on a surface of said metallic conduit and forming a metallic coating layer on said plating layer by plating treatment which is effected by using a room-temperature molten-salt electrolytic bath.

2. The method of manufacturing a metallic-conduit-armored type linear member according to claim 1, wherein a metallic tape is formed of copper, a copper alloy, or stainless steel, and said metallic coating layer is formed of aluminum.

3. The method of manufacturing a metallic-conduit-armored type linear member according to claim 1, wherein said room-temperature molten-salt electrolytic bath is an electrolytic bath using an $AlCl_3$-1-butyl pyridinium chloride-based or $AlCl_3$-ethyl-methylimidazolium chloride-based room-temperature molten salt.

4. The method of manufacturing a metallic-conduit-armored type linear member according to claim 1, wherein said electrolytic bath is 80 to 150° C.

5. The method of manufacturing a metallic-conduit-armored type linear member according to claim 1, wherein said electrolytic bath is 80 to 100° C.

6. A method of manufacturing a metallic-conduit-armored type linear member, comprising:
- a basic step of forming an armoring metallic conduit into an interior of which a linear member can be loaded, by forming a metallic tape into a tubular member and by joining a seam of said tubular member;
- a plating step of forming a plating layer on the surface of said metallic conduit; and
- a metallic coating step of forming a metallic coating layer on said plating layer by performing plating by using a room-temperature molten-salt electrolytic bath.

7. The method of manufacturing a metallic-conduit-armored type linear member according to claim 6, further comprising: an inspecting step provided between said basic step and said plating step for performing quality inspection of said armoring metallic conduit.

8. The method of manufacturing a metallic-conduit-armored type linear member according to claim 7, further comprising: a repairing step provided between said inspection step and said plating step for repairing a defect in said armoring metallic conduit as a result of said quality inspection.

9. The method of manufacturing a metallic-conduit-armored type linear member according to claim 6, further comprising: an extra-length adjusting step for adjusting the extra length of said linear member with respect to said armoring metallic conduit.

10. The method of manufacturing a metallic-conduit-armored type linear member according to claim 9, wherein said extra-length adjusting step has a step of providing control such that the extra length of said linear member with respect to said armoring metallic conduit ultimately reaches a target value, by taking into consideration a longitudinal shrinkage of said armoring metallic conduit due to virtual mechanical processing occurring between said basic step and said metallic coating step or in said metallic coating step.

11. The method of manufacturing a metallic-conduit-armored type linear member according to claim 10, wherein said virtual mechanical processing is processing which occurs as a result of engagement of said armoring metallic conduit with a rotating member.

12. A method of manufacturing a metallic-conduit-armored type linear member, comprising:
- a basic step of forming an armoring metallic conduit into an interior of which a linear member can be loaded, by forming a metallic tape into a tubular member and by joining a seam of said tubular member;
- an inspecting step for performing quality inspection of said armoring metallic conduit;
- a plating step of forming a plating layer on the surface of said metallic conduit; and
- a metallic coating step of forming a metallic coating layer on said plating layer by performing plating by using a room-temperature molten-salt electrolytic bath.

13. The method of manufacturing a metallic-conduit-armored type linear member according claim to 12, further comprising a repairing step provided between said inspection step and said plating step for repairing a defect in said armoring metallic conduit detected as a result of said quality inspection.

14. The method of manufacturing a metallic-conduit-armored type linear member according to claim 12, wherein said basic step has an extra-length adjusting step for adjusting the extra length of said linear member with respect to said armored metallic conduit, and a taking-up step for taking up said armoring metallic conduit for which repair has been completed and for storing said armored metallic conduit on a rotating member and a step of unwinding said armoring metallic conduit taken up in said taking-up step so as to be used in said metallic coating step are further provided between said repairing step and said plating step.

15. The method of manufacturing a metallic-conduit-armored type linear member according to claim 12, further comprising: an extra-length adjusting step for adjusting the extra length of said linear member with respect to said armoring metallic conduit.

16. The method of manufacturing a metallic-conduit-armored type linear member according to claim 15, wherein said extra-length adjusting step has a step of providing control such that the extra length of said linear member with respect to said armoring metallic conduit ultimately reaches a target value, by taking into consideration a longitudinal shrinkage of said armoring metallic conduit due to virtual mechanical processing occurring between said basic step and said metallic coating step or in said metallic coating step.

17. The method of manufacturing a metallic-conduit-armored type linear member according to claim 16, wherein said virtual mechanical processing is processing which occurs as a result of engagement of said armoring metallic conduit with a rotating member.

18. A system for manufacturing a metallic-conduit-armored type linear member, comprising:
- a basic processing apparatus for forming an armoring metallic conduit into an interior of which a linear member can be loaded, by forming a metallic tape into a tubular member and by joining a seam of said tubular member;
- a plating apparatus for forming a plating layer on a surface of said armoring metallic conduit; and
- a metallic coating apparatus for forming a metallic coating layer on said plating layer by performing plating by using a room-temperature molten-salt electrolytic bath.

19. The system for manufacturing a metallic-conduit-armored type linear member according to claim 18, further comprising: an inspecting apparatus for performing quality inspection of said armoring metallic conduit fabricated by said basic processing apparatus.

20. The system for manufacturing a metallic-conduit-armored type linear member according to claim 19, further comprising: a repairing apparatus for repairing flaws in said armoring metallic conduit detected by said inspecting apparatus.

21. The system for manufacturing a metallic-conduit-armored type linear member according to claim 18 or 19, further comprising: an extra-length adjusting apparatus for adjusting the extra length of said linear member with respect to said armoring metallic conduit.

22. A metal-conduit-armored linear member assembly, comprising:

a linear member;

a metallic conduit body for armoring said linear member;

an aluminum coating layer provided on said metallic conduit body; and a nickel plating layer provided between said metallic conduit body and said aluminum coating layer to improve adhesion between said metallic conduit body and said aluminum coating layer.

23. A metal-conduit-armored linear member assembly according to claim 22, wherein said linear member is an optical fiber.

24. A metal-conduit-armored linear member assembly according to claim 22, wherein said metallic conduit body further armors a water sealing compound.

25. A metallic conduit for armoring an optical fiber, said metal conduit comprising:

a metallic conduit body;

an aluminum coating layer provided on said metallic conduit body; and a nickel plating layer provided between said metallic conduit body and said aluminum coating layer to improve adhesion between said metallic conduit body and said aluminum coating layer.

26. A metallic conduit according to claim 25, which further armors a water sealing compound.

* * * * *